United States Patent [19]
Bradley

[11] 3,889,529
[45] June 17, 1975

[54] RECTANGULAR HYDRAULIC LOAD CELL

[75] Inventor: Chester D. Bradley, Darien, Conn.

[73] Assignee: The A. H. Emery Company, New Canaan, Conn.

[22] Filed: Apr. 17, 1974

[21] Appl. No.: 461,587

[52] U.S. Cl. .............................. 73/141 R; 177/208
[51] Int. Cl. ........................ G01l 1/02; G01g 5/04
[58] Field of Search .................... 73/141 R; 177/208

[56] References Cited
UNITED STATES PATENTS

| | | | |
|---|---|---|---|
| 2,960,328 | 11/1960 | Tate | 177/208 X |
| 3,354,973 | 11/1967 | Farquhar | 177/208 |

Primary Examiner—James J. Gill
Attorney, Agent, or Firm—St. Onge Mayers Steward & Reens

[57] ABSTRACT

A rectangular hydraulic load cell having a length greater than its width to maintain substantial acting area for high load capacity in narrow locations. The force is transmitted from a load bearing column to a steel diaphragm over the oil reservoir with four bridging members having precise 45° cuts at their ends to reduce friction as the bridging members move under load. Pivot strips with hardened pivot wires are provided which bear upon the upper surface of the bridging members. For precise lateral positioning of the cell column, spacer strips are secured to the casing around the bridging members to form a rectangular lateral bearing surface for the bridging members.

6 Claims, 6 Drawing Figures

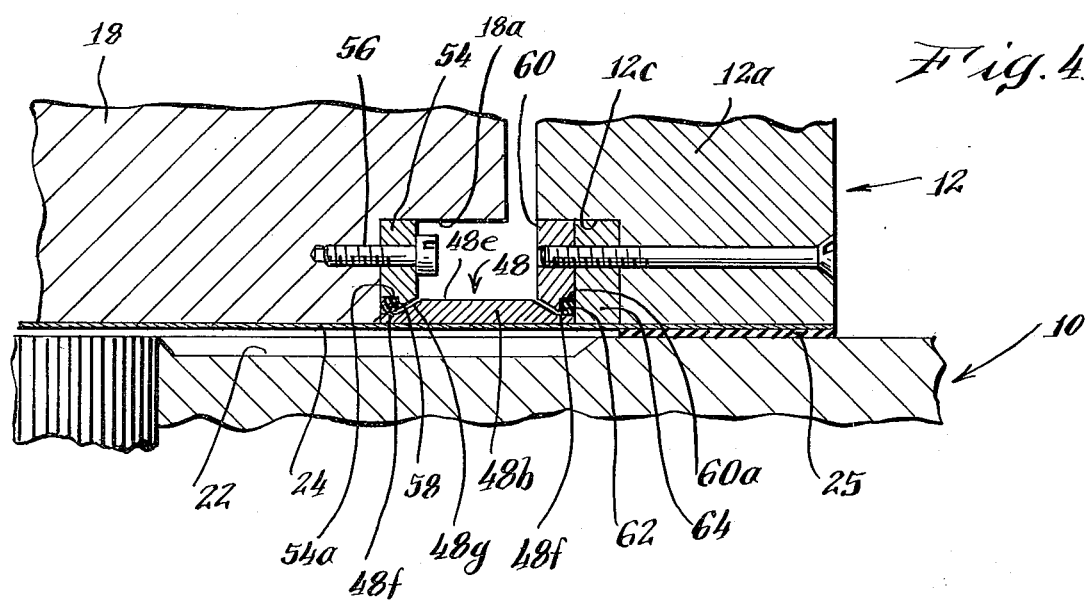
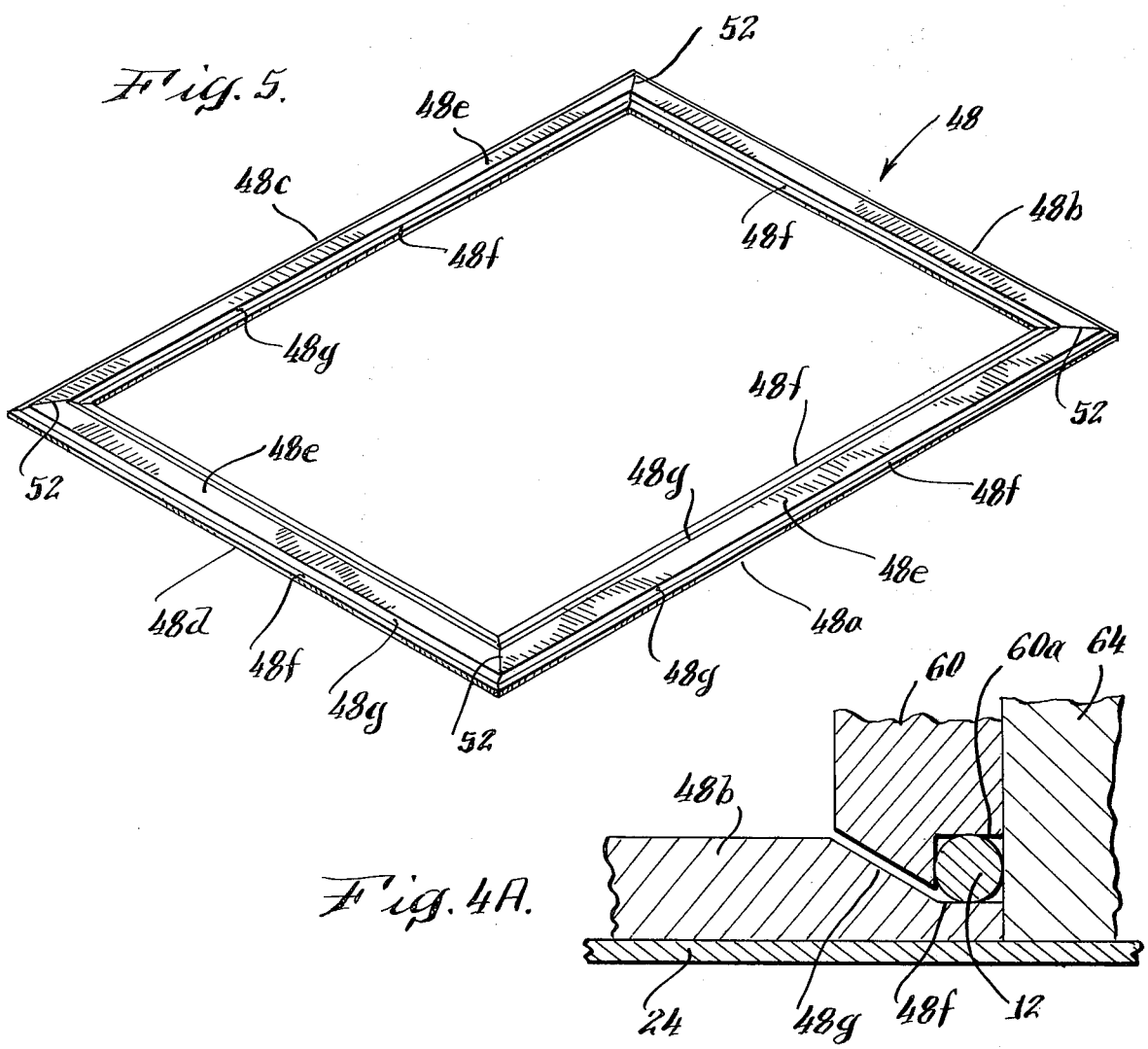

RECTANGULAR HYDRAULIC LOAD CELL

BACKGROUND OF THE INVENTION

This invention relates to hydraulic load cells and more particularly to a hydraulic load cell of rectangular configuration which provides a substantial amount of acting area and weighing and measuring capacity within a limited width dimension for the cell.

Hydraulic load cells for weight or force measuring are known such as those disclosed in U.S. Pat. Nos. 2,960,328; 3,145,795; 3,089,518; and 3,646,854. These hydraulic load cells are generally of two types, of which one has a flexible diaphragm for containing hydraulic fluid made of woven material impregnated with rubber or other polymers and the type which has a diaphragm of thin sheet steel. Load cells having the flexible woven type diaphragm generally have a much lower load carrying capacity and the present invention is concerned with the thin steel diaphragm type with higher load capacities.

In general, the hydraulic load cell of either type is a device for transmitting weight or force to a body of hydraulic fluid contained below the column or piston of the device with changes in weight or force resulting in corresponding changes in hydraulic pressure from a thin reservoir under the cell diaphragm as the diaphragm is forced down by the column. This fluid pressure is transmitted through the base of the cell to an indicator which may comprise a Bourdon tube or may be a transducer which converts hydraulic pressure into an electrical signal.

The acting area for a given load range must be sufficient to handle the desired load capacity and provide proper range of pressure to operate readout instrumentation. The acting area of the cell in square inches is equal to the range of load in pounds divided by the range of hydraulic pressure expressed in pounds per square inch.

The acting area of a round area cell is equal to the area of the mean diameter of the bridge ring. The area of a rectangular area cell is equal to the area of the rectangle formed by the center lines of the bridge strips.

The acting area of the cell also determines the hydraulic pressure for a given load. The acting area must thus be sufficient to provide reasonable operating pressures for a given load capacity.

Heretofore, such hydraulic load cells have been made in a round configuration so that to increase the acting area of the cell requires an increase in the cell diameter. It has been found however, that in some applications existing industrial structures do not permit installation of substantially large round hydraulic load cells since the required load cell diameter in these applications exceeds the width of space available in the weighing of a tank, bin, process vat or the like.

Thus, the problem is that round hydraulic load cells of a diameter to fit the available space do not have sufficient load capacity for the application. In such situations there is generally substantial room in the direction transverse to the width dimension of available space.

Accordingly, it is an object of this invention to provide a hydraulic load cell having a rectangular configuration which has substantial load bearing capacity;

A further object of the invention is to provide a hydraulic load cell of the above character which has high accuracy;

Another object of the invention is to provide a load cell of the above character which is relatively inexpensive to manufacture and to maintain;

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

SUMMARY OF THE INVENTION

The invention comprises a rectangular hydraulic load cell having a thin metal diaphragm which supports the load bearing column assembly over the hydraulic fluid reservoir in the cell base. Most of the load on the column assembly compresses the fluid under the diaphragm. A small part of the load on the column assembly is transmitted to the bridging members through hardened pivots which are secured in a shoulder on the bottom of the column and similar pivots are positioned in a shoulder of the casing ring. Approximately one-half of the area of the bridging members receives load from the column to also cause pressure in the fluid. The fluid area of the reservoir directly under the column plus approximately one-half of the area of the bridging members comprises the effective or acting area of the cell.

The bridging members are made of four hardened strips of metal having precise 45° angles at their ends so that when the four strips are placed in a rectangular configuration, the strips completely bridge the space between the column and the casing ring of the cell which overlies the diaphragm. These bridging members further provide positive lateral positioning for the lower end of the column and in another aspect of the invention, bear against spacer strips secured to the vertical wall of the shoulder which has been milled in the casing ring. The spacer strips provide a rectangular bearing surface which closely conforms to the position of the bridging members.

The rectangular load cell of the invention makes it possible to maintain a substantial acting area of the cell to maintain cell capacity while permitting the cell to be fitted into relatively narrow existing spaces where cells of substantial diameter or width could not be accommodated. The bridging assemblies of the rectangular cell provide the lateral bearing and positioning of the load transmitting column while permitting flexure of the metal diaphragm with a minimum of friction which would impair cell accuracy.

For a fuller understanding of the nature and objects of the invention, reference should be had to the following detailed description taken in connection with the accompanying drawings, in which:

Similar reference characters refer to similar parts throughout the several views of the drawings.

FIG. 4 is an enlarged partial side view in section taken along line 4—4 of FIG. 3; and FIG. 4A is a still further enlarged partial view of the pivot and bridging member portion shown in FIG. 4; and FIG. 5 is a perspective view of the bridging members placed in their rectangular configuration.

DETAILED DESCRIPTION OF THE PREFERRED EMBODIMENT

Figure 1:
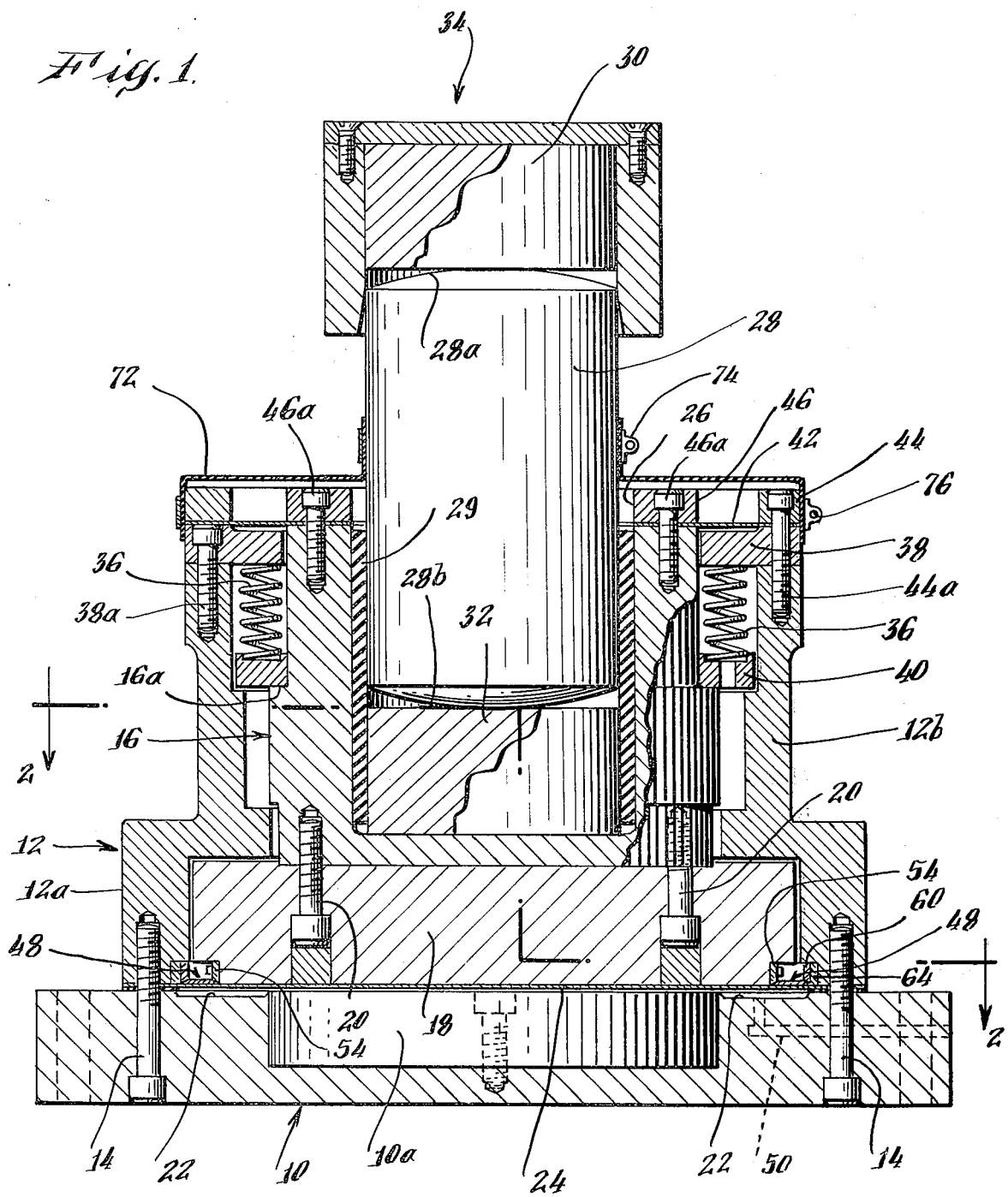
FIG. 1 is a side elevational view of a hydraulic load cell of the present invention, partially broken away and in section taken along line 1—1 of FIG. 2.
Figure 2:
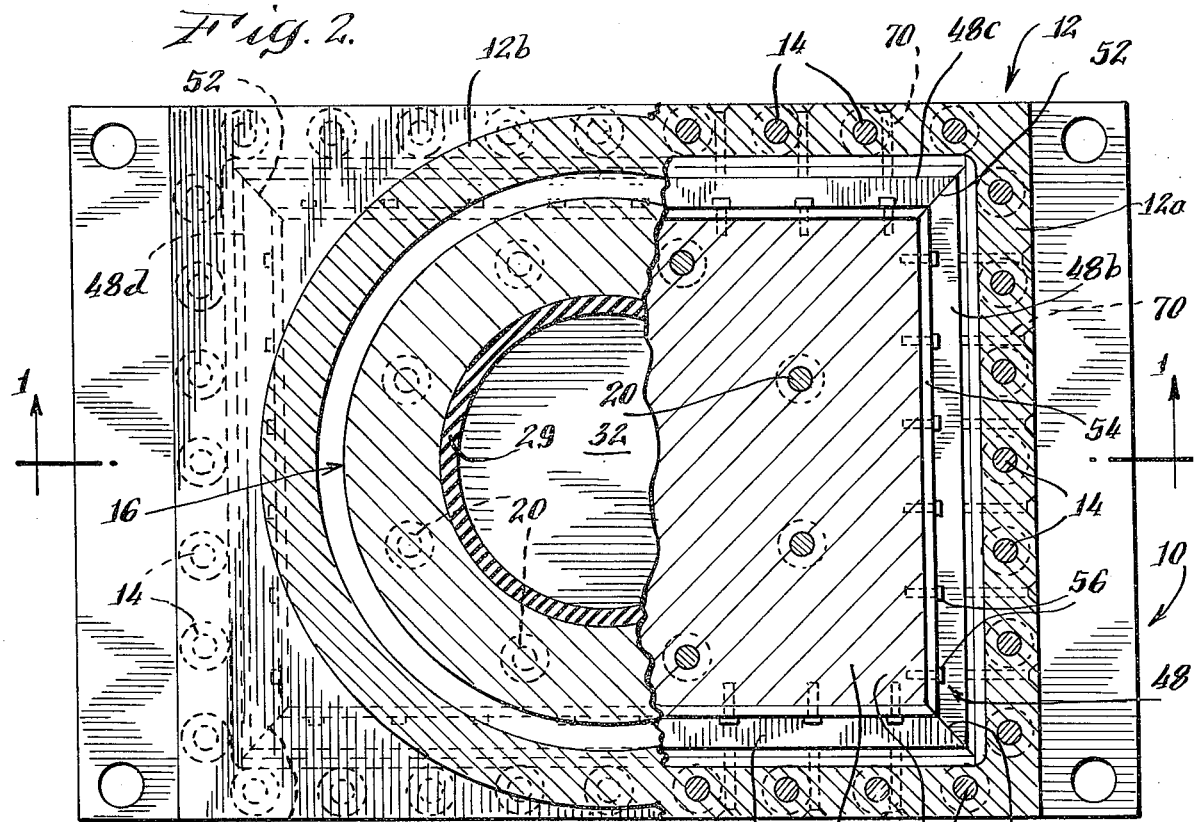
FIG. 2 is a top view of the hydraulic load cell of the present invention, partially broken away and in partial section taken along line 2—2 of FIG. 1.

Referring now to FIGS. 1 and 2, it can be seen that the hydraulic load cell of the invention comprises a base 10, which is preferably made of aluminum and is of a rectangular configuration as best seen in FIG. 2. The base is preferably provided with a central plateau portion 10a which is made of a nickel steel alloy to compensate for ambient temperature changes as set forth in U.S. Pat. No. 3,178,937. A casing member 12 is secured by bolts 14 to the base. The casing member may be cast of, for example, an aluminum alloy and has a lower rectangular portion 12a and an upper circular portion 12b. The casing member may be cast as one piece or the portions 12a and 12b cast separately and bolted or otherwise joined together.

Within the casing 12 is a column assembly 16 which has a column block portion 18 secured by bolts 20 thereto for transmitting the load or force to the hydraulic fluid in the reservoir 22 formed in the top of the base. The column assembly may also be cast in one piece or as shown in two pieces which are bolted together. It is preferred that the column block portion 18 be made of steel to maintain rigidity at the corners of the block when it is under load. If the column assembly is cast as one piece it is preferably made of cast iron. The hydraulic fluid is contained in reservoir 22 by a thin, flexible, rectangular diaphragm 24 which is clamped tightly between the base and casing of the cell by bolts 14 and sealed by gasket 25. The diaphragm is preferably made of stainless steel.

Column 16 has a deep central opening 26 in which is positioned a load cylinder 28 having spherical rounded ends 28a, 28b which contact load blocks 30 and 32, respectively positioned in the load head 34 and the lower portion of the column well 26. The load cylinder is surrounded by a polymeric sleeve 29 to keep the cylinder resiliently centered in opening 26. The column 16 is surrounded by a number of preload springs 36 which are seated in spring rings 38 and 40. Spring ring 38 is secured to the top of the casing by bolts 38a and the spring ring 40 rests on a shoulder 16a of the column. These springs maintain a minimum pressure on the hydraulic fluid. The column 16 at its upper end is secured laterally by a stay plate 42 which is clamped by rings 44 and 46 by bolts 44a, 46a, respectively, to the top of the casing 12 and column 16. The stayplate is preferably made of thin stainless steel and permits vertical movement of the column assembly while maintaining lateral stability. The total vertical travel of the column generally does not exceed 0.050 inch so the stay plate does not impair vertical movement.

At the lower end of the column assembly the rectangular column block 18 is secured against lateral movement by four bridging strip members 48 which are positioned between the bottom of the column block 18 and the bottom portion of the casing member 12, as will be described in more detail hereinafter. These bridging members are made of hardened steel and provide for the slight vertical movement below the column and column block with respect to the casing member 12. These bridging members thus not only provide lateral positioning of the lower end of the column assembly, but also permit flexure of the diaphragm 24 without sharp edges contacting the diaphragm which might tend to fatigue or rupture it. This relative movement between the column assembly and the remainder of the cell also requires that there be a pivoting action between the column assembly and the bridging members. The load cell should measure weight or force as accurately as possible and it is essential that there be no undue friction or hysteresis between any moving parts of the cell which could impair accuracy. A passage 50 from the hydraulic fluid reservoir 22 is drilled in the base and is connectable to an outside pressure transducer device which translates the weight or force into direct reading or converts the information from hydraulic pressure to an electrical signal for further transmission.

As best seen in FIGS. 3, 4, 4A and 5, the bridging members 48a, b, c and d all abut each other at a precise 45° angle as at 52 so that upon downward flexure of each bridging member there is no friction or hang-up between the edges of the bridging members. The column block 18 is provided with a lower shoulder portion 18a in which pivot or bearing strips 54 are held by screws 56 and in which there is provided a notch 54a preferably having a pivot wire 58 secured therein by clamping between the column block and the bearing strip. The pivot wires bear on the bridge strip members and are preferably made of hardened steel such as piano wire or the like. Similarly, the casing 12 has a shoulder portion 12c formed therein in which pivot strip 60 is secured. The pivot strip has a shoulder 60a at its lower end in which pivot wire 62 is clamped in position to bear on the bridging members.

Figure 3:
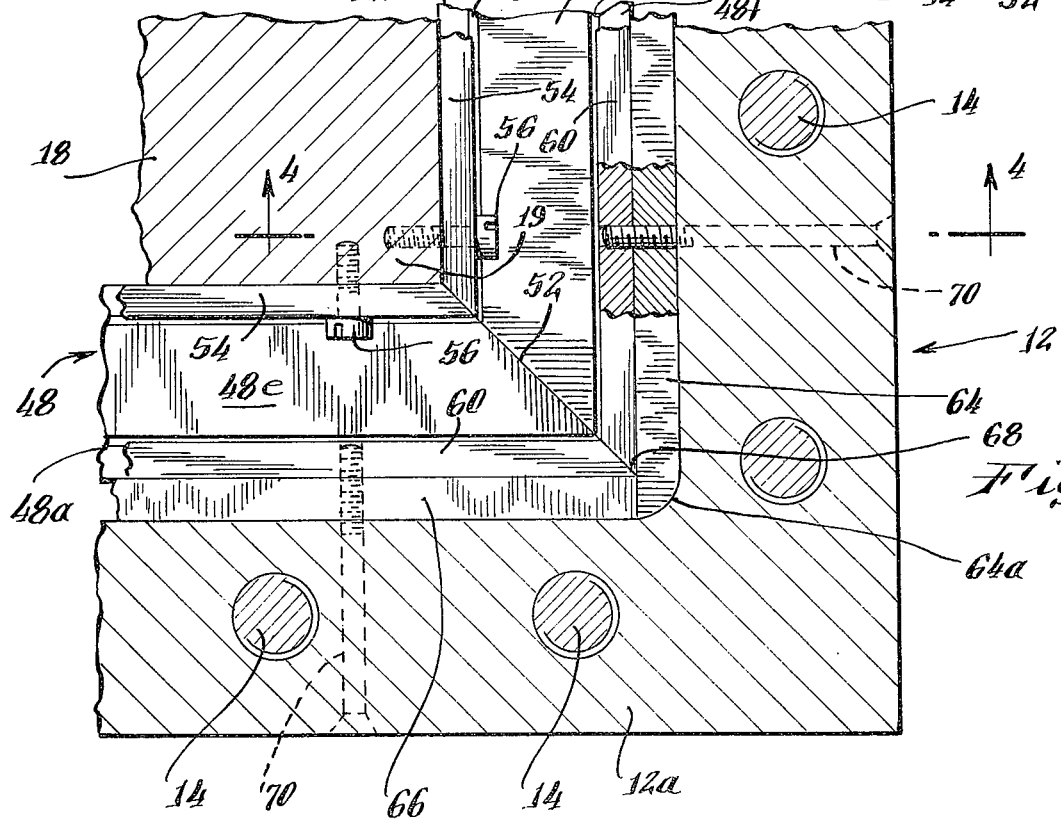
FIG. 3 is a partial enlarged top view of the lower right hand corner of the cell shown in FIG. 2.

In the casing ring there are also provided spacer strips 64, 66 around the bridging members. As best seen in FIGS. 2 and 3, the corners 64a of strip 64 are rounded to fit into the milled shoulder portion 12c of the casing to provide rectangular corners 68 for the bridging member. The spacers 64, 66 are also made of steel and are held along with the pivot strips 60 by screws 70 in the casing shoulder portion 12a. As shown in FIG. 4, the bridging members such as 48b may be provided with a raised central section 48e for increased strength while maintaining the bearing areas 48f as thin, flat portions with bevels 48g forming the central section.

The hydraulic fluid is contained under the diaphragm over the entire reservoir surface. When a load is placed upon the head 34 the weight is transmitted through the load cylinder to the column assembly of the cell causing increased pressure in the hydraulic fluid below the diaphragm. The column block 18 also transmits force to the bridging members 48 so that they also share in creating pressure in the hydraulic fluid. The hydraulic pressure is uniform throughout the entire reservoir 22. The preload springs 16 maintain a minimum load and pressure in the hydraulic fluid to provide linearity of load to pressure output under minimum loading conditions. The column block 18 is made with substantial thickness and resulting rigidity so that it will not bend at any point of contact with the diaphragm and will remain substantially in a flat plane from zero to full capacity load. If the corners 19 (FIG. 2) were to deflect upwardly under load, additional downward movement of the column would be necessary to fully transmit the load to the hydraulic fluid. Such increased movement is undesirable since it increases errors due to friction.

When a load is applied to load head 34, the column assembly and the diaphragm moves downwardly to subject the hydraulic fluid to corresponding pressure. In so moving, the inner sides of the bridging members 48 move downwardly under pivot 54 (FIG. 4) while the other side of the bridging members pivot under pivot 60. Friction in such pivoting action is minimized by the low friction contact of the smooth hardened steel pivot wires 58 and 62 and the hardened bridging members 48. Typically, the downward motion of the column block 18 in the cell is about 0.005 inch and accordingly, the pivoting action is very slight, but friction at these parts would affect the accuracy of the cell. Least friction at the bridging members is also accomplished by the provision of the precise 45° angle at the ends of each bridging member where they abut one another with minimal clearance. True pivoting of the bridging members on the pivot wires is accomplished only by a 45° angle on the bridging member ends. If the bridging member ends are not cut at 45°, those bridging members having an end angle of greater than 45° would have to bend when the bridging members are deflected downwardly, thus introducing unwanted friction.

The bridging members 48 also maintain the column assembly laterally against spacers 64 which provide a closely conforming rectangular bearing surface for the bridging members to bear against. The stay plate 42 provides lateral stability for the upward portion of the column and lateral forces are further taken up by the load cylinder 28 which tends to roll slightly on its spherical ends when side forces are encountered. A flexible rubber boot 72 held by clamps 74, 76 seals the upper portion of the cell while permitting some lateral movement of the load cylinder 28.

The rectangular load cell of the present invention makes possible its installation in existing structures where the width dimension is narrow, while still providing the necessary acting area for desired load capacity. The construction of the bridging members, pivot strips and spacers makes it possible to construct such a cell and still maintain a high degree of accuracy.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

What is claimed is:

1. A hydraulic load cell comprising, in combination:
    A. a base member
        1. having means forming a rectangular fluid reservoir therein,
        2. and having outlet means connectable to a pressure transducer;
    B. a thin flexible diaphragm overlaying said fluid reservoir means;
    C. means for securing said diaphragm to said base to contain fluid under pressure;
    D. a column positioned over said diaphragm,
        1. said column having a lower portion adjacent said diaphragm of rectangular configuration and generally conforming to the shape of said fluid reservoir means,
        2. said lower column portion having means forming an extending portion to form shoulders around the periphery of said lower portion, said shoulders having a substantially vertical and a substantially horizontal surface;
    E. a casing surrounding said lower column portion,
        1. said casing being of a rectangular configuration,
        2. and having shoulders around its lower end in substantially horizontal alignment with said column shoulders, said shoulders having substantially vertical and substantially horizontal surfaces;
    F. four elongated bridging members positioned around said column between the shoulders of said column and the shoulders of said casing ring,
        1. said bridging members each having 45° angles at their ends to provide essentially continuous bridging in a rectangular configuration between said casing and said column; and
    G. low friction pivot means between said horizontal surfaces of said column shoulders and said bridging members and between said horizontal surfaces of said casing shoulders and said bridging members.

2. The hydraulic load cell defined in claim 1 wherein said pivot means comprises a plurality of elongated bearing strips interposed between said horizontal surface of said column shoulders and between said horizontal surfaces of said casing shoulders, said bearing strips having a hardened, rounded lower edge bearing on said bridging members.

3. The hydraulic load cell defined in claim 2 wherein said lower edge of said elongated bearing strips comprises means forming a shoulder portion along said lower edge and a round hardened wire positioned on said shoulder, said wire having a diameter greater than the depth of said shoulder and extending substantially the length of said strip.

4. The hydraulic load cell defined in claim 1 wherein said base is also of rectangular configuration and the length of said reservoir is substantially greater than its width to provide substantial acting area in said load cell for a given transverse dimension.

5. The hydraulic load cell defined in claim 1 wherein there are provided spacer strips between said casing shoulder and said bridging members, said spacer strips closely fitting into the casing shoulder to provide a substantially rectangular bearing surface for lateral retention of said bridging members.

6. The hydraulic load cell defined in claim 3 wherein the width of said bearing strip shoulder portions are less than the diameter of said wire and there is further provided means securing said strips to said column and to said casing to clamp and retain said wires.

* * * * *